United States Patent
Baita et al.

(10) Patent No.: US 10,011,666 B2
(45) Date of Patent: *Jul. 3, 2018

(54) CATALYST FOR THE POLYMERIZATION OF OLEFINS

(71) Applicant: BASELL POLIOLEFINE ITALIA S.R.L., Milan (IT)

(72) Inventors: Pietro Baita, Ferrara (IT); Tiziano Dall'Occo, Ferrara (IT); Maria Di Diego, Ferrara (IT); Dario Liguori, Ferrara (IT); Lorella Marturano, Ferrara (IT); Gabriele Mei, Ferrara (IT); Giampiero Morini, Ferrara (IT); Roberta Pica, Ferrara (IT)

(73) Assignee: Basell Poliolefine Italia S.r.l., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 15/514,871

(22) PCT Filed: Sep. 22, 2015

(86) PCT No.: PCT/EP2015/071674
§ 371 (c)(1),
(2) Date: Mar. 28, 2017

(87) PCT Pub. No.: WO2016/050555
PCT Pub. Date: Apr. 7, 2016

(65) Prior Publication Data
US 2017/0218100 A1 Aug. 3, 2017

(30) Foreign Application Priority Data
Oct. 2, 2014 (EP) .................................. 14187408

(51) Int. Cl.
*C08F 110/02* (2006.01)
*C08F 4/649* (2006.01)
*C08F 2/34* (2006.01)
*C08F 2/38* (2006.01)
*B01J 8/24* (2006.01)

(52) U.S. Cl.
CPC ........ *C08F 110/02* (2013.01); *C08F 2410/02* (2013.01)

(58) Field of Classification Search
CPC ......... C08F 2/34; C08F 4/6493; C08F 4/6494
USPC ....................................... 526/124.9; 502/127
See application file for complete search history.

(56) References Cited

U.S. PATENT DOCUMENTS

| 5,804,614 A * | 9/1998 | Tanaglia | C08F 210/16 523/204 |
| 6,271,321 B1 | 8/2001 | Ford et al. | |
| 7,514,508 B2 * | 4/2009 | Meier | B01J 8/0055 526/348.5 |
| 2005/0239636 A1 | 10/2005 | Gao et al. | |
| 2011/0207901 A1 | 8/2011 | Chang | |

FOREIGN PATENT DOCUMENTS

EP  0529977 A1  3/1993

OTHER PUBLICATIONS

PCT International Search Report and Written Opinion dated Nov. 18, 2015 (Nov. 18, 2015) for Corresponding PCT/EP2015/071674.

* cited by examiner

*Primary Examiner* — Fred M Teskin

(57) ABSTRACT

The present disclosure provides a catalyst system made from or containing: (A) a solid catalyst component made from or containing (i) a titanium compound supported on a magnesium dichloride; (B) an aluminum alkyl compound; and (C) a halogenated organic ester of formula A-COOR, wherein R is a $C_1$-$C_{10}$ hydrocarbon group and A is a $C_1$-$C_{15}$ saturated or unsaturated hydrocarbon group in which at least one of the hydrogen atoms is replaced by a chlorine atom. The present disclosure also provides a process for preparing an olefinic polymer, including a polymerization step of polymerizing an olefin in the presence of the catalyst system. The present disclosure also provides an olefinic polymer made therefrom.

12 Claims, No Drawings

US 10,011,666 B2

CATALYST FOR THE POLYMERIZATION OF OLEFINS

This application is the U.S. National Phase of PCT International Application PCT/EP2015/071674, filed Sep. 22, 2015, claiming benefit of priority to European Patent Application No. 14187408.1, filed Oct. 2, 2014, the contents of which are incorporated herein by reference in its entirety.

FIELD OF THE INVENTION

In general, the present disclosure relates to the field of chemistry. More specifically, the present disclosure relates to polymer chemistry. In particular, the present disclosure relates to catalysts for the polymerization of olefins.

BACKGROUND OF THE INVENTION

Polymerization activity of a catalyst system can depend on polymerization conditions, such as temperature and pressure.

After achieving steady polymerization conditions, the polymerization activity of the catalyst system may become unsatisfactory. Then, the amount of catalyst fed to the reactor must be increased or its residence time increased.

When the amount of catalyst is increased, the cost per unit of polymer produced also increases. When the residence time is increased, the productivity of the plant decreases. There is a need to increase catalyst activity after use of the catalyst in a polymerization process.

In ethylene polymerization processes that use Ti-based Ziegler-Natta catalysts with aluminum alkyls and hydrogen as molecular weight regulator, there is a need to (a) reduce ethane generated from ethylene hydrogenation and (b) prevent the unproductive consumption of ethylene.

BRIEF SUMMARY OF THE INVENTION

The present disclosure provides a catalyst system made from or containing
(A) a solid catalyst component made from or containing
   (i) a titanium compound supported on a magnesium dichloride;
(B) an aluminum alkyl compound; and
(C) a halogenated organic ester of formula
   A-COOR,
wherein
R is a $C_1$-$C_{10}$ hydrocarbon group and
A is a $C_1$-$C_{15}$ saturated or unsaturated hydrocarbon group in which at least one of the hydrogen atoms is replaced by a chlorine atom.

The present disclosure also provides a process for preparing an olefinic polymer, including a polymerization step of polymerizing an olefin in the presence of the catalyst system. The present disclosure also provides an olefinic polymer made therefrom.

While multiple embodiments are disclosed, still other embodiments will become apparent to those skilled in the art from the following detailed description. As will be apparent, certain embodiments, as disclosed herein, are capable of modifications in various obvious aspects, all without departing from the spirit and scope of the claims as presented herein. Accordingly, the drawings and detailed description are to be regarded as illustrative in nature and not restrictive.

DETAILED DESCRIPTION OF THE INVENTION

The present invention now will be described more fully hereinafter. However, this invention can be embodied in many different forms and should not be construed as limited to the embodiments set forth herein; rather, these embodiments are provided so that this disclosure will satisfy applicable legal requirements. As such, it will be apparent to those skilled in the art that the embodiments can incorporate changes and modifications without departing from the general scope. It is intended to include all the modifications and alterations in so far as the modifications and alterations come within the scope of the appended claims or the equivalents thereof.

As used in this specification and the claims, the singular forms "a," "an," and "the" include plural referents unless the context clearly dictates otherwise.

As used in this specification and the claims, the terms "comprising," "containing," or "including" mean that at least the named compound, element, material, particle, or method step, etc., is present in the composition, the article, or the method, but does not exclude the presence of other compounds, elements, materials, particles, or method steps, etc., even if the other such compounds, elements, materials, particles, or method steps, etc., have the same function as that which is named, unless expressly excluded in the claims. It is also to be understood that the mention of one or more method steps does not preclude the presence of additional method steps before or after the combined recited steps or intervening method steps between those steps expressly identified.

Moreover, it is also to be understood that the lettering of process steps or ingredients is a means for identifying discrete activities or ingredients and the recited lettering can be arranged in any sequence, unless expressly indicated.

For the purpose of the present description and of the claims which follow, except where otherwise indicated, numbers expressing amounts, quantities, percentages, and so forth, are to be understood as being modified by the term "about". Also, ranges include any combination of the maximum and minimum points disclosed and include any intermediate ranges therein, which may or may not be specifically enumerated herein.

Definitions

In the present description, the term "α-olefin" or "alpha-olefin" means an olefin of formula $CH_2$=CH—R, wherein R is a linear or branched alkyl containing from 1 to 10 carbon atoms. The α-olefin can be selected, for example, from: propylene, 1-butene, 1-pentene, 1-hexene, 1-octene, 1-dodecene and the like.

In the present description, the term "BET surface area" as used herein refers to the surface area of particles measured in units of $m^2/g$ and calculated using the BET method of surface area determination.

In the present description, the term "first" refers to the order in which a particular species is presented and does not necessarily indicate that a "second" species will be presented. For example, "first polymer composition" refers to the first of at least one polymer composition. The term does not reflect priority, importance, or significance in any other way. Similar terms used that can be used herein include "second," "third," "fourth," etc.

In the present description, the term "homopolymer" as used herein is consistent with its ordinary meaning. To the extent that a homopolymer can contain one or more monomeric units, the incorporation of any additional monomeric units has no measurable effect on the polymer's primary, secondary or tertiary structure or no effect on the polymer's physical or chemical properties. In other words, there is no measureable difference between a polymer comprising 100 weight percent of a first monomeric unit, and a co-polymer that includes more than one monomeric units.

In the present description, the terms "monomer" and "comonomer" are used interchangeably. The terms mean any compound with a polymerizable moiety that is added to a reactor in order to produce a polymer. In those instances in which a polymer is described as comprising one or more monomers, e.g., a polymer comprising propylene and ethylene, the polymer, of course, comprises units derived from the monomers, e.g., —$CH_2$—$CH_2$—, and not the monomer itself, e.g., $CH_2$=$CH_2$.

In the present description, the term "olefin" means a hydrocarbon of formula $CH_2$=CH—R, wherein R is H or an alkyl, cycloalkyl, or aryl containing from 1 to 12 carbon atoms.

In the present description, the term "polymer" means a macromolecular compound prepared by polymerizing monomers of the same or different type. The term "polymer" includes homopolymers, copolymers, terpolymers, interpolymers, and so on.

In the present description, the term "polyolefin" is used herein broadly to include polymers such as polyethylene, ethylene-alpha olefin copolymers, polypropylene, polybutene, and ethylene copolymers having at least about 50 percent by weight of ethylene polymerized with a lesser amount of a comonomer such as vinyl acetate, and other polymeric resins within the "olefin" family classification.

In the present description, the term "substantially spherical morphology" means particles having a length of its greater axis (G), a length of its smaller axis (S), and a ratio G/S with an upper limit of about 1.5. In some embodiments, the term means particles having a ratio G/S lower than about 1.3.

In general embodiments, the present disclosure provides a catalyst system made from or containing
(A) a solid catalyst component made from or containing
 (i) a molar amount ($Ti_0$) of a titanium compound supported on a molar amount ($Mg_0$) of a magnesium dichloride;
(B) a molar amount (Al) of an aluminum alkyl compound; and
(C) a molar amount ($A_{Ester}$) of a halogenated organic ester of formula

A-COOR, wherein
 R is a $C_1$-$C_{10}$ hydrocarbon group and
 A is a $C_1$-$C_{15}$ saturated or unsaturated hydrocarbon group in which at least one of the hydrogen atoms is replaced by a chlorine atom.
Solid Catalyst Component (A)

In some embodiments, the solid catalyst component (A) is free from vanadium compounds.

In some embodiments, the titanium compound has the formula $Ti(OR^{II})_nX_{y-n}$, wherein
 n is a number is in the range from about 0 to about 0.5 inclusive,
 y is the valence of titanium,
 $R^{II}$ is an alkyl, cycloalkyl or aryl radical having 1-8 carbon atoms, and
 X is halogen.
In other embodiments, $R^{II}$ is selected from the group consisting of ethyl, isopropyl, n-butyl, isobutyl, 2-ethylhexyl, n-octyl, phenyl, and benzyl.

In other embodiments, y is 4 and n is in the range from about 0 to about 0.02. In particular embodiments, y is 3 and n is in the range from about 0 to about 0.015.

In some embodiments, the titanium compound is $TiCl_4$.

In other embodiments, X is chlorine.

In some embodiments, the solid catalyst component is further made with or to contain an internal electron donor compound (electron donor). In other embodiments, the electron donor is selected from the group consisting of ethers, esters, amines and ketones. In particular embodiments, the electron donor is selected from the group consisting of esters of aliphatic carboxylic acids, esters of aromatic carboxylic acids, and cyclic alkyl ethers. In more particular embodiments, the electron donor is selected from the group consisting of phthalates, acetates, tetrahydrofuran, and diethers. In specific embodiments, the electron donor is selected from the group consisting of ethylacetate, benzoates, and alkoxybenzenes.

In some embodiments, the electron donor compound is present in a molar amount (ED) such that a molar ratio ED/$Ti_0$ is in the range from about 0.1 to about 8. In other embodiments, the range is from about 0.5 to about 7. In particular embodiments, the range is from about 1 to about 6.

In some embodiments, the solid catalyst component (A) has a porosity $P_F$ (deriving from pores with radius up to 1µ) determined with the mercury method in the range from about 0.2 to 0.80 about $cm^3/g$. In other embodiments, the range is from about 0.3 to about 0.70 $cm^3/g$. In particular embodiments, the range is from 0.35 to about 0.60 $cm^3/g$.

In some embodiments, the solid catalyst component (A) has a surface area measured by the BET method lower than about 80 $m^2/g$. In other embodiments, the surface areas are in the range from about 10 to about 70 $m^2/g$.

In some embodiments, the porosity measured by the BET method is in the range from about 0.10 to about 0.50 $cm^3/g$. In other embodiments, the porosity is in the range from about 0.10 to about 0.40 $cm^3/g$.

In some embodiments, the particles of the solid catalyst component have a substantially spherical morphology and an average diameter in the range from about 5 to about 150 µm. In other embodiments, the average diameter is in the range from about 20 to about 100 µm. In particular embodiments, the average diameter is in the range from about 30 to about 80 µm.

In some embodiments, the substantially spherical particles can be prepared by a process, including a reaction step (a) of reacting compounds
 (i) a molar amount ($Mg_1$) of $MgCl_2.mR^{III}OH$,
wherein
 0.3≤m≤1.7 and
 $R^{III}$ is an alkyl, cycloalkyl or aryl radical having 1-12 carbon atoms, and
 (ii) a molar amount ($Ti_1$) of $Ti(OR^I)_nX_{4-n}$
wherein
 n is a number is in the range from about 0 to about 0.5 inclusive,
 y is the valence of titanium,
 $R^{II}$ is an alkyl, cycloalkyl or aryl radical having 1-8 carbon atoms, and
 X is halogen.

In some embodiments, the compound $MgCl_2.mR^{III}OH$ is a precursor of a Mg dihalide. In some embodiments, the compound $MgCl_2.mR^{III}OH$ can be obtained by mixing alcohol and magnesium chloride in the presence of an inert hydrocarbon immiscible with the adduct, operating under stirring conditions at the melting temperature of the adduct (100-130° C.). Then, quickly quenching the emulsion, thereby causing the solidification of the adduct in form of spherical particles. Examples of these methods are disclosed in U.S. Pat. No. 4,469,648, U.S. Pat. No. 4,399,054, and Patent Cooperation Treaty Publication No. WO/1998/44009, which are incorporated herein by reference in their entirety.

An example of other useful methods is spray cooling, which is disclosed in U.S. Pat. No. 5,100,849 and U.S. Pat. No. 4,829,034, which are incorporated herein by reference in their entirety.

In some embodiments, adducts having a certain final alcohol content can be obtained by using the selected amount of alcohol. However, if adducts with increased porosity are to be obtained, adducts can be prepared first with more than 1.7 moles of alcohol per mole of $MgCl_2$ and then subject the adducts to a thermal dealcoholation process or a chemical dealcoholation process. The thermal dealcoholation process can be carried out in nitrogen flow at temperatures between 50 and 150° C. until the alcohol content is reduced to the value ranging from 0.3 to 1.7. See European Patent No 395083.

In some embodiments, these dealcoholated adducts can be characterized by a porosity (measured by mercury method) in a range from about 0.15 to about 2.5 $cm^3/g$, having pores of a radius up to 1 μm. In other embodiments, the porosity can be in the range from about 0.25 to about 1.5 $cm^3/g$.

In some embodiments, the molar ratio $Ti_1/Mg_1$ is stoichiometric or higher. In other embodiments, the ratio is higher than about 3. In particular embodiments, a larger excess of the titanium compound is used.

In some embodiments, the titanium compound is a titanium tetrahalide. In other embodiments, the titanium compound is $TiCl_4$.

In some embodiments, the reaction step (a) can be carried out by suspending the adduct in cold $TiCl_4$ (about 0° C.), then heating the mixture up to 80-140° C., and keeping the mixture at that temperature for a time period in the range of 0.5 to 8 hours. In other embodiments, the residence time is in the range from about 0.5 to about 3 hours. The excess of titanium compound can be separated at high temperatures by filtration or sedimentation and siphoning.

In some embodiments, the reaction step (a) is repeated two or more times.

In some embodiments, an electron donor compound can be added together with the titanium compound in the reaction system for reaction with the $MgCl_2 \cdot mR'''OH$ adduct.

In other embodiments, an internal electron donor compound is added in a subsequent step after the completion of the reaction between the adduct and the titanium compound. See, for example, Patent Cooperation Treaty Publication No. WO2004/106388, which is incorporated herein by reference in its entirety.

In some embodiments, the solid catalyst component is subjected to prepolymerization in the presence of aluminum alkyls, small amount of monomer, and optionally an external donor. See, for example, Patent Cooperation Treaty Application No. PCT/EP2014/061958.

Aluminum Alkyl Compound (B)

In some embodiments, the aluminum alkyl compound (B) is halogenated.

In some embodiments, the aluminum alkyl compound (B) is an Al-trialkyl compound. In other embodiments, the aluminum alkyl compound is selected from the group consisting of Al-trimethyl, Al-triethyl, Al-tri-n-butyl, and Al-triisobutyl.

In some embodiments, the $Al/Ti_0$ ratio is higher than 1. In other embodiments, the ratio is in the range from about 5 to about 800.

Halogenated Organic Ester (C)

In some embodiments, the molar ratio $A_{Ester}/Ti_0$ is in the range from about 0.1 to about 10. In other embodiments, the range is from about 0.5 to about 8. In particular embodiments, the range is from about 1 to about 6. In specific embodiments, the range is from about 3.5 to about 10.

In some embodiments, the R group of the halogenated organic ester is selected from the group consisting of $C_1$-$C_5$ linear alkyl groups.

In some embodiments, the A group of the halogenated organic ester is a saturated linear hydrocarbon group having up to four carbon atoms.

In some embodiments, the chlorine atom of the halogenated organic ester replaces a hydrogen atom linked to the carbon atom in the alpha position with respect to the carboxylic group.

In some embodiments, at least two atoms hydrogens of the halogenated organic ester are replaced by chlorine atoms. In other embodiments, at least three atoms hydrogens are replaced by chlorine atoms.

In some embodiments, the halogenated organic ester is selected from the group consisting of ethyl trichloroacetate, butyl perchlorocrotonate, and 2-chloro propionate.

In general embodiments, the present disclosure provides a process for preparing an olefinic polymer, including a polymerization step of polymerizing an olefin in the presence of the disclosed catalyst system.

In some embodiments, components (A), (B), and (C) of the catalyst system can be fed separately into a reactor.

In some embodiments, a pre-contact of the components can occur for a period of time ranging from about 0.1 to 120 minutes. In other embodiments, the period of time can range from about 1 to about 60 minutes.

In some embodiments, a pre-contact of the components can occur in the presence of small amounts of olefins.

In some embodiments, a pre-contact of the components can be carried out in a liquid diluent at a temperature ranging from about 0 to about 90° C. In other embodiments, the temperature range is from about 20 to about 70° C.

In some embodiments, the catalyst system is used directly in a main polymerization process. In other embodiments, the catalyst system is pre-polymerized. In particular embodiments, pre-polymerization occurs when a main polymerization process is carried out in the gas phase and a pre-polymerization has not yet occurred in the preparation of the solid catalyst component (A).

In some embodiments, the pre-polymerization is carried out with any olefin. In other embodiments, the pre-polymerization occurs with ethylene, propylene or mixtures thereof with one or more α-olefins, containing up to 20% in moles of α-olefin and forming amounts of polymer from about 0.1 g per gram of solid component up to about 1000 g per gram of solid catalyst component.

In some embodiments, the pre-polymerization is carried out at temperatures from about 0 to about 80° C., in the liquid or gas phase. In other embodiments, the temperatures are in the range from about 5 to about 70° C.

The pre-polymerization can be performed in-line as a part of a continuous polymerization process or separately in a batch process. In some embodiments, the batch pre-polymerization of a catalyst component occurs with ethylene to produce an amount of polymer in the range from about 0.5 to 20 g per gram of the catalyst component.

In some embodiments, a pre-polymerized catalyst component can be treated with a titanium compound before being used in the main polymerization step. The reaction with the titanium compound can be carried out by suspending the pre-polymerized catalyst component in the liquid titanium compound, heating the mixture to 60-120° C., and maintaining the mixture that temperature for 0.5-2 hours. In other embodiments, the mixture also contains with a liquid diluent. In particular embodiments, the titanium compound is $TiCl_4$.

The catalyst systems can be used in any kind of polymerization process, including liquid and gas-phase processes.

In some embodiments, the polymerization processes are carried out at a temperature ranging from about 60 to about 130° C. In other embodiments, the temperature ranges from about 70 to about 110° C.

In some embodiments, the solid catalyst component (A), having a particle size less than 40 µm in diameter, is used in a slurry polymerization process in an inert medium, which process can be carried out in a continuously-stirred tank reactor or loop reactors. In other embodiments, the solid catalyst component (A), having a particle size of at least 40 µm, is used in a gas-phase polymerization process, which process can be carried out in agitated or fluidized bed gas-phase reactors.

In some embodiments, the process for preparing an olefinic polymer is a gas-phase process, including:
   a) a polymerization step of polymerizing ethylene, optionally with a comonomer, in a first gas-phase reactor in the presence of a first amount of hydrogen and
   b) a copolymerization step of copolymerizing ethylene with a comonomer in a second gas-phase reactor in the presence of a second amount of hydrogen, wherein the second amount is less than the first amount,
where in at least one of the gas-phase reactors, the growing polymer particles
   i) flow upward through a first polymerization zone (riser) under fast fluidization or transport conditions,
   ii) leave the riser,
   iii) enter a second polymerization zone (downcomer) through which the particles flow downward under gravity,
   iv) leave the downcomer, and
   v) are reintroduced into the riser,
thereby establishing a circulation of polymer between the polymerization zones.

In the first polymerization zone (riser), fast fluidization conditions are established by feeding a gas mixture made from or containing one or more olefins (ethylene and comonomers) at a velocity higher than the transport velocity of the polymer particles. In some embodiments, the velocity of the gas mixture is between about 0.5 to about 15 m/s. In other embodiments, the velocity is between about 0.8 to about 5 m/s. The terms "transport velocity" and "fast fluidization conditions" are as defined in D. Geldart, Gas Fluidisation Technology, page 155 et seq., J. Wiley & Sons Ltd., 1986.

In the second polymerization zone (downcomer), the polymer particles flow under gravity in a densified form, so that high values of density of the solid are reached (mass of polymer per volume of reactor), which approach the bulk density of the polymer. In other words, the polymer flows vertically down through the downcomer in a plug flow (packed flow mode), so that no more than small quantities of gas are entrained between the polymer particles.

In some embodiments, the process for making an olefinic polymer is a gas-phase process for the homopolymerization or copolymerization of ethylene. In other embodiments, the gas-phase process generates ethane due to the hydrogenation of ethylene in an amount less than about 3.8 Kg ethane/ton PE. In particular embodiments, the amount of ethane generated is less than about 3.5 Kg ethane/ton PE.

In a general embodiment, the present disclosure provides an olefinic polymer made from a process, including a step of polymerizing an olefin in the presence of the disclosed catalyst system.

In some embodiments, the olefinic polymer is selected from the group consisting of very-low-density polyethylenes (VLDPEs), ultra-low-density polyethylenes (ULDPEs), elastomeric copolymers of ethylene and propylene, and elastomeric terpolymers of ethylene and propylene with smaller proportions of a diene. The VLDPEs have a density lower than about 0.920 $g/cm^3$, consist of copolymers of ethylene with one or more alpha-olefins having from 3 to 12 carbon atoms, and have a mole content of units derived from ethylene of higher than about 80%.

The ULDPEs have a density in the range from about 0.880 $g/cm^3$ to about 0.920 $g/cm^3$, consist of copolymers of ethylene with one or more alpha-olefins having from 3 to 12 carbon atoms, and have a mole content of units derived from ethylene of higher than about 80%. The elastomeric polymers have a content by weight of units derived from ethylene of between about 30 and about 70%.

EXAMPLES

The following examples are included to demonstrate embodiments. It should be appreciated by those of skill in the art that the techniques disclosed in the examples which follow represent techniques discovered to function well, and thus can be considered to constitute exemplary modes of practice. However, those of skill in the art should, in light of the present disclosure, appreciate that many changes can be made in the specific embodiments which are disclosed and still obtain a like or similar result without departing from the spirit and scope of this disclosure.

Characterizations

The properties were determined according to the following methods:

MIE flow index: ASTM-D 1238 condition E
MIF flow index: ASTM-D 1238 condition F
MIP flow index: ASTM D 1238 condition P
Bulk density: DIN-53194

Porosity and surface area with nitrogen were determined according to the B.E.T. method, using a SORPTOMATIC 1900.

Porosity and Surface Area with Mercury:

The measure was carried out using a "Pascal 240" series porosimeter.

The porosity was determined by intrusion of mercury under pressure. For this determination, a calibrated dilatometer (capillary diameter 3 mm) CD3P was connected to a reservoir of mercury and a high-vacuum pump. A weighed amount of sample was placed in the dilatometer. The apparatus was then placed under high vacuum (<0.1 mm Hg) and maintained in these conditions for 20 minutes. The dilatometer was then connected to the mercury reservoir. The mercury flowed slowly into dilatometer until the mercury reaches the level marked on the dilatometer at a height of 10 cm. The valve, connecting the dilatometer to the vacuum pump, was closed, and then the mercury pressure was gradually increased with nitrogen up to 140 kg/cm2. Under pressure, the mercury entered the pores and the level decreased in proportion to the porosity of the material.

For supports and catalysts with pores up to 1 μm, the porosity (cm³/g) and the pore distribution curve were calculated from the integral pore distribution curve.

General Procedure for the HDPE Polymerization Test

Ethylene Polymerization in Iso-Hexane Solvent

A 4.5-liter stainless-steel autoclave was equipped with a magnetic stirrer, a temperature indicator, a pressure indicator, and a feeding line for iso-hexane, ethylene, and hydrogen. It was used and purified by fluxing pure nitrogen at 70° C. for 60 minutes. Then, a solution of 1550 cm³ of iso-hexane containing 5.00 cm³ of 8% by wt/vol TEAL/iso-hexane was introduced at a temperature of 30° C. under nitrogen flow.

In a separate 200 cm³ round bottom glass bottle, the following ingredients were successively introduced: 50 cm³ of anhydrous iso-hexane; 1.25 cm³ of 8% by wt/vol, TEAL/iso-hexane solution; 0.020÷0.030 grams of the solid catalyst as prepared in Example 1; and the amount of promoter reported in Table 1. The components were mixed together, aged 10 minutes at room temperature, and introduced under nitrogen flow into the autoclave reactor.

The autoclave was closed, then the temperature was raised to 85° C. Hydrogen (3 bars partial pressure) and ethylene (7.0 bars partial pressure) were added.

Under continuous stirring, the total pressure was maintained at 85° C. for 120 minutes by feeding ethylene. At the end, the reactor was depressurized and the temperature was dropped to 30° C.

The recovered polymer was dried at 40° C. under vacuum and analyzed.

Examples 1-3 and Comparative 1

Procedure for the Preparation of the Solid Catalyst Component (A)

A magnesium chloride and alcohol adduct containing about 3 mols of alcohol was prepared following the method described in Example 2 of U.S. Pat. No. 4,399,054, at 2000 RPM instead of 10,000 RPM. The adduct was thermally treated, under nitrogen stream, over a temperature range of 50-150° C. until a weight content of 25% of alcohol was reached.

1 L of $TiCl_4$ was introduced at 0° C. into a nitrogen-purged, 2 L four-necked round flask. At the same temperature, 70 g of a spherical $MgCl_2$/EtOH adduct containing 25% wt of ethanol was added under stirring. The temperature was raised to 140° C. in 2 h and maintained for 120 minutes. The stirring was discontinued. The solid product settled, and the supernatant liquid was siphoned off. The solid residue was then washed once with heptane at 80° C. and five times with hexane at 25° C. and dried under vacuum at 30° C.

351.5 cm³ of hexane and 7 g of the catalyst component were introduced under stirring at 20° C. into a 260 cm³ glass reactor. While maintaining the internal temperature, 5.6 cm³ of tri-n-octylaluminum (TNOA) in hexane (about 370 g/l) was added to the reactor. The temperature was lowered to 10° C.

After 10 minutes stirring, 10 g of propylene was added to the reactor at the same temperature during a time of 4 hours. The consumption of propylene in the reactor was monitored, and the polymerization was discontinued when a theoretical conversion of 1 g of polymer per g of catalyst was reached.

Then, the whole content was filtered and washed three times with hexane at a temperature of 30° C. (50 g/l).

After drying, the resulting pre-polymerized catalyst (A) was analyzed and found to contain 1.05 g of polypropylene per g of initial catalyst, 2.7% Ti, 8.94% Mg, and 0.1% Al.

The solid catalyst component (A) was employed in the ethylene polymerization according to the general procedure, using the type and amount of promoter compound (C) reported in Table 1.

Examples 4-9 and Comparative 2

Preparation of the Solid Component (A)

A magnesium chloride and alcohol adduct containing about 3 mols of alcohol was prepared following the method described in Example 2 of U.S. Pat. No. 4,399,054, at 2000 RPM instead of 10,000 RPM. The adduct was thermally treated, under nitrogen stream, over a temperature range of 50-150° C. until a weight content of 24.4% of alcohol was reached.

1 L of $TiCl_4$ was introduced at 0° C. into a nitrogen-purged, 2 L four-necked round flask. At the same temperature, 70 g of a spherical $MgCl_2$/EtOH adduct containing 24.4% wt of ethanol was added under stirring. The temperature was raised to 130° C. in 2 h and maintained for 90 min. The stirring was discontinued. The solid product settled, and the supernatant liquid was siphoned off. A new amount of fresh $TiCl_4$ was added to the flask, to return to the initial liquid volume. The temperature was maintained at 130° C. for 90 minutes. The solid settled, and the liquid was siphoned off. The solid was then washed three times with anhydrous iso-hexane (400 mL at each washing) at 60° C. and twice at 40° C.

At the end, the residual solid was suspended in 600 mL of dry iso-hexane. At the same temperature, under stirring, 92 ml of ethylacetate was added dropwise.

The temperature was raised to 50° C., and the mixture was stirred for 2 hours. After stirring was discontinued, the solid product settled and the supernatant liquid was siphoned off.

The solid was washed twice with anhydrous hexane (2×100 mL) at 40° C., recovered, dried under vacuum, and analyzed. The solid contained Mg=15.0% wt, Ti=2.4 wt %, and AcOEt=26.9% wt.

The solid catalyst component (A) was employed in the ethylene polymerization according to the general procedure, using the type and amount of promoter compound (C) reported in Table 1.

Example 10 and Comparative Example 3

The catalyst (A) according to Example 4 was used in the gas-phase polymerization of ethylene according to the following procedure.

A gas phase polymerization of ethylene was carried out in a fluidized bed reactor, equipped with automated pressure and temperature controls. The solid catalyst (about 0.140 g) was pre-contacted in hexane slurry at room temperature with triethyl aluminum (TEA) and THF (Al/THF=25 molar ratio). The mixture was heated to 50° C. for 1 hour under continuous stirring. The pre-contact-slurry was discharged into the gas phase reactor.

The gas phase reactor was maintained at a temperature of 80° C. and at a pressure of 24 bars. The gas phase included ethylene 10 mol %, hydrogen 10 mol %, and propane 80 mol %.

After introducing the pre-contacted catalyst into the reactor, ethylene was continuously fed to maintain constant reactor pressure during the polymerization test. After two hours, the ethylene was stopped. The polymer bed was discharged into a degassing vessel. The polymer was recovered and additionally degassed under vacuum.

The results are reported in Table 2.

TABLE 1

| EX. | Comp. C | C/Ti (mol Ratio) | Activity (Kg/g) | MIE (dg/min) | MIF/MIE | B.D. (g/cm³) |
|---|---|---|---|---|---|---|
| Comp. 1 | — | — | 18.6 | 0.34 | 33.2 | 0.189 |
| 1 | Cl₃C—COOEt | 2.19 | 19.9 | 0.25 | 33.8 | 0.194 |
| 2 | " | 4 | 21.5 | — | — | — |
| 3 | " | 8.4 | 22.6 | 0.45 | 32.9 | 0.209 |
| Comp. 2 | — | — | 9.7 | 0.38 | 31.6 | 0.335 |
| 4 | Cl₃C—COOEt | 4.1 | 13.3 | 0.82 | 31.8 | 0.330 |
| 5 | " | 3.7 | 14.7 | 0.70 | 29.0 | 0.339 |
| 6 | " | 7.2 | 14.7 | 0.92 | 29.9 | 0.36 |
| 7 | BPCC | 4 | 15.9 | 0.98 | 30.6 | 0.332 |
| 8 | " | 6.2 | 14.0 | 1.8 | 30.1 | 0.281 |
| 9 | CH₃CHCl—COOEt | 4.0 | 14.4 | 0.41 | 30.7 | 0.346 |

BPCC = Cl₃C—CH=C(CH₃)COOBu

TABLE 2

| EX. | Comp. C | C/Ti (mol Ratio) | Activity (Kg/g/bar C₂/h) | MIE (dg/min) | MIF/MIE | B.D. (g/cm³) |
|---|---|---|---|---|---|---|
| Comp. 3 | — | — | 1.13 | 2.9 | 27.2 | 0.404 |
| 10 | Cl₃C—COOEt | 4.2 | 1.30 | 2.7 | 29.2 | 0.402 |

Example 11

The polymerization process was carried out in a plant equipped with (i) a small reactor (pre-contacting pot) in which the catalyst components were mixed to form the catalytic system, (ii) a second transit vessel receiving the catalytic system, and (iii) a fluidized bed reactor kept under fluidization conditions with propane receiving the catalyst mixture.

The following reactants were fed to the pre-contacting pot: (i) a solid catalyst component prepared as described in Example 1; (ii) liquid propane as diluent; and (iii) a solution of TIBAL.

The catalytic system was fed from the pre-contacting section (first vessel) to the second vessel and then to the gas-phase fluidized bed reactor. The monomer feed, an antistatic agent (glycerol monostearate), and a hexane solution of activity improver were admixed under the conditions reported in Table 3. The polymer discharged from the final reactor was transferred to the steaming section and then dried at 70° C. under a nitrogen flow and weighed.

The polymer properties are reported in Table 3.

TABLE 3

|  |  |  | EXAMPLE 11 |
|---|---|---|---|
| PCPs | T | ° C. | 40 |
|  | Alkyl Type | — | TIBAL |
|  | Alk/cat | g/g | 2 |
|  | Alk/THF | g/g |  |
| Product (FBR) | T | ° C. | 80 |
|  | P | bar | 27 |
|  | Antistatic (AA) type |  | GMS |
|  | AA/polymer | ppm wt | 147 |
|  | Cl₃C—COOEt/Ti | mol/mol | 1.6 |
|  | C₂⁻ | % | 10.7 |
|  | H₂/C₂⁻ | — | 2.5 |

TABLE 3-continued

|  |  | EXAMPLE 11 |
|---|---|---|
| C₂⁺/PE | kg/ton PE | 2.3 |
| Mileage | g/g | 3867 |
| MIE | g/10' | 158.0 |
| PBD | g/cc | 0.481 |

Example 12-13 and Comparative Example 4

The polymerization process was carried out in the same apparatus described for Example 11. However, the catalyst was prepared according to Example 1 of Patent Cooperation Treaty Application No. PCT/EP2014/061958 with tetrahydrofuran as an external donor. Atmer 163 was used as an antistatic instead of GMS. Polymerization conditions and results are reported in Table 4.

TABLE 4

|  |  |  | EXAMPLE |  |  |
|---|---|---|---|---|---|
|  |  |  | Comp. 4 | 12 | 13 |
| PCPs | T | ° C. | 50 + 50 | 50 | 50 |
|  | Alkyl Type | — | TEAL | TEAL | TEAL |
|  | Alk/cat | g/g | 3.0 | 3.0 | 3.0 |
|  | Alk/THF | g/g | 44.0 | 44.0 | 44.0 |
| FBR | T | ° C. | 80 | 80 | 80 |
|  | P | bar | 27 | 27 | 27 |
|  | Antistatic (AA) type |  | ATMER | ATMER | ATMER |
|  | AA/prod | ppm wt | 102 | 90 | 90 |
|  | Cl₃C—COOEt/Ti | mol/mol | — | 2.8 | 1.17 |
|  | C₂⁻ | % | 15.5 | 15.5 | 15.5 |
|  | H₂/C₂⁻ | — | 2.7 | 2.4 | 2.6 |
|  | C₂⁺/PE | kg/ton PE | 3.9 | 0.9 | 3.4 |
|  | Spec. Mil. | g/g · bar · h | 302 | 399 | 388 |
|  | MIE | g/10' | 84.0 | 94.0 | 88.0 |
|  | PBD | g/cc | 0.408 | 0.426 | 0.425 |

Example 14-15 and Comparative Example 5

The polymerization process was carried out in the same apparatus described for Example 10. However, in the second vessel, prepolymerization of the catalyst was prepared according to Example 4 and the conditions reported in Table 5.

TABLE 5

|  |  |  | EXAMPLE |  |  |
|---|---|---|---|---|---|
|  |  |  | Comp. 5 | 14 | 15 |
| PCPs | T | ° C. | 60 | 60 | 60 |
|  | tau | min | 29 | 29 | 29 |
|  | Alkyl Type | — | TEAL | TEAL | TEAL |
|  | Alk/cat | g/g | 6.0 | 6.0 | 6.0 |
|  | Alk/THF | g/g | 44.0 | 44.0 | 44.0 |
| PRE-POLY | T | ° C. | 60 | 60 | 60 |
|  | C₂⁻ feed/CAT | g/g | 11 | 11 | 11 |
|  | H₂/C₂⁻ | Mol. Ratio | 0.25 | 0.25 | 0.25 |
|  | IV | dl/g | 1.12 | 0.94 | n.a. |
| FBR | T | ° C. | 80 | 80 | 80 |
|  | P | bar | 24 | 24 | 24 |
|  | Antistatic (AA) type |  | ATMER | ATMER | ATMER |
|  | AA/prod | ppm wt | 101 | 114 | 119 |
|  | Cl₃C—COOEt/Ti | mol/mol | — | 4.1 | 2.8 |

TABLE 5-continued

| | | EXAMPLE | | |
|---|---|---|---|---|
| | | Comp. 5 | 14 | 15 |
| $C_2^-$ | % | 14.2 | 14.5 | 13.9 |
| $H_2/C_2^-$ | — | 2.1 | 2.1 | 1.9 |
| $C_2^+$/PE | kg/ton PE | 5.9 | 3.2 | 2.4 |
| Spec. Mil. | g/g · bar · h | 476 | 571 | 680 |
| MIE | g/10' | 80.0 | 87.0 | 78.0 |
| PBD | g/cc | 0.484 | 0.475 | 0.477 |

It should be understood that various changes, substitutions and alterations can be made herein without departing from the spirit and scope of this disclosure as defined by the appended claims. Moreover, the scope of the present application is not intended to be limited to the particular embodiments of the process, machine, manufacture, composition of matter, means, methods and steps described in the specification. As one of the ordinary skill in the art will readily appreciate from the disclosure, processes, machines, manufacture, compositions of matter, means, methods, or steps, presently existing or later to be developed that perform substantially the same function or achieve substantially the same result as the corresponding embodiments described herein can be utilized. Accordingly, the appended claims are intended to include within their scope such processes, machines, manufacture, compositions of matter, means, methods, or steps.

What is claimed is:

1. A catalyst system comprising:
   (A) a solid catalyst component made from
      (i) a molar amount (Ti) of a titanium compound supported on a molar amount (Mg) of a magnesium dichloride at a Ti/Mg molar ratio of greater than about 3;
   (B) a molar amount (Al) of an aluminum alkyl compound; and
   (C) a molar amount ($A_{Ester}$) of a halogenated organic ester of the formula A-COOR,
   wherein
   R is a $C_1$-$C_{10}$ hydrocarbon group and A is a $C_1$-$C_{15}$ saturated or unsaturated hydrocarbon group, in which at least one of the hydrogen atoms is replaced by a chlorine atom.

2. The catalyst system according to claim 1, wherein the A group of the halogenated organic ester is a saturated linear hydrocarbon group having up to four carbon atoms.

3. The catalyst system according to claim 1, wherein the chlorine atom replaces a hydrogen atom linked to the carbon atom in the alpha position with respect to the carboxylic group.

4. The catalyst system according to claim 1, wherein at least two atoms of hydrogen of the halogenated organic ester are replaced by chlorine atoms.

5. The catalyst system according to claim 1, wherein the R group of the halogenated organic ester is selected from the group consisting of $C_1$-$C_5$ linear alkyl groups.

6. The catalyst system according to claim 5, wherein the halogenated organic ester (C) is ethyl trichloroacetate.

7. The catalyst system according to claim 1, wherein molar ratio $A_{Ester}/Ti_0$ is in the range from about 0.1 to about 10.

8. The catalyst system according to claim 1, wherein molar ratio $A_{Ester}/Ti_0$ is in the range from about 0.5 to about 8.

9. The catalyst system according to claim 1, wherein molar ratio $A_{Ester}/Ti_0$ is in the range from about 3.5 to about 10.

10. A process for preparing an olefinic polymer comprising:
   (a) a polymerization step of polymerizing an olefin in the presence of a catalyst system comprising
      (A) a solid catalyst component comprising
         (i) a molar amount ($Ti_0$) of a titanium compound supported on a molar amount ($Mg_0$) of a magnesium dichloride;
      (B) a molar amount (Al) of an aluminum alkyl compound; and
      (C) a molar amount ($A_{Ester}$) of a halogenated organic ester of formula A-COOR,
      wherein
      R is a $C_1$-$C_{10}$ hydrocarbon group,
      A is a $C_1$-$C_{15}$ saturated or unsaturated hydrocarbon group in which at least one of the hydrogen atoms is replaced by a chlorine atom; and
      the olefin is ethylene and the polymerization step is carried out in gas-phase.

11. The process according to claim 10, wherein the polymerization step occurs in the presence of hydrogen and generates ethane in an amount less than 3.8 about Kg ethane/ton PE.

12. A process for preparing an olefinic polymer comprising:
   a) a polymerization step of polymerizing ethylene, optionally with a comonomer, in a first gas-phase reactor in the presence of a first amount of hydrogen and
   b) a copolymerization step of copolymerizing ethylene with a comonomer in a second gas-phase reactor in the presence of a second amount of hydrogen, wherein the second amount is less than the first amount,
   where in at least one of the gas-phase reactors, the growing polymer particles
   i) flow upward through a first polymerization zone (riser) under fast fluidization or transport conditions,
   ii) leave the riser,
   iii) enter a second polymerization zone (downcomer) through which the particles flow downward under gravity,
   iv) leave the downcomer, and
   v) are reintroduced into the riser,
   thereby establishing a circulation of polymer between the polymerization zones, wherein the process is a gas-phase process and the olefinic polymer is selected from the group consisting of very-low-density polyethylenes (VLDPEs), ultra-low-density Polyethylenes (ULDPEs), elastomeric ethylene/propylene copolymers and elastomeric ethylene/propylene/diene terpolymers.

* * * * *